United States Patent
Hao et al.

(10) Patent No.: US 7,622,882 B2
(45) Date of Patent: Nov. 24, 2009

(54) POSITION DETECTION DEVICE FOR PERMANENT MAGNETIC MACHINES

(75) Inventors: Lei Hao, Troy, MI (US); Zilai Zhao, Novi, MI (US)

(73) Assignee: Magna Electronics Inc., Holly, MI (US)

( * ) Notice: Subject to any disclaimer, the term of this patent is extended or adjusted under 35 U.S.C. 154(b) by 147 days.

(21) Appl. No.: 11/841,226

(22) Filed: Aug. 20, 2007

(65) Prior Publication Data

US 2008/0061724 A1    Mar. 13, 2008

Related U.S. Application Data

(60) Provisional application No. 60/823,042, filed on Aug. 21, 2006.

(51) Int. Cl.
*H02P 1/46* (2006.01)

(52) U.S. Cl. .................. 318/721; 318/700; 318/701; 318/702; 318/400.36

(58) Field of Classification Search ............... 318/661, 318/652, 400.01, 400.12, 400.16, 400.33, 318/400.39, 704, 823, 79, 127, 154, 400.14, 318/400.35, 400.36, 437, 489, 504, 560, 318/701, 721, 722, 723, 724
See application file for complete search history.

(56) References Cited

U.S. PATENT DOCUMENTS

| | | | | |
|---|---|---|---|---|
| 3,349,229 A | * | 10/1967 | Evans | ................. 318/571 |
| 4,204,257 A | * | 5/1980 | Hungerford | ................. 700/195 |
| 4,357,569 A | * | 11/1982 | Iwakane et al. | ............. 318/721 |
| 5,569,990 A | * | 10/1996 | Dunfield | ................. 318/400.33 |
| 5,969,496 A | * | 10/1999 | Yamada et al. | ............... 318/715 |
| 6,040,673 A | * | 3/2000 | Isomura et al. | ............. 318/615 |
| 6,401,875 B1 | * | 6/2002 | Marvin et al. | ................ 187/393 |
| 6,441,572 B2 | * | 8/2002 | Batzel | .................... 318/400.33 |
| 6,445,154 B1 | * | 9/2002 | Toyozawa et al. | ........... 318/700 |
| 7,045,982 B2 | * | 5/2006 | Amakusa | ............... 318/400.05 |
| 7,170,283 B2 | * | 1/2007 | Toyozawa et al. | ...... 324/207.25 |
| 7,233,123 B2 | * | 6/2007 | Koczara et al. | ........ 318/400.01 |
| 2006/0125439 A1 | * | 6/2006 | Ajima et al. | ................. 318/716 |

OTHER PUBLICATIONS

Stephen J. Chapman, Electric Machinery Fundamentals, Copyright 1991, 1985, McGraw-Hill, Inc, 2nd Edition, pp. 19 Thru 27 and 340-343.*

* cited by examiner

*Primary Examiner*—Bentsu Ro
*Assistant Examiner*—Anthony M Paul
(74) *Attorney, Agent, or Firm*—Alex Porat; Magna International Inc.

(57) ABSTRACT

The invention indicates a correct one of multiple rotor positions. For example, the invention can determine, in a PM machine, which of two possible positions a rotor is in when the position is known only within ±π radians. If the actual rotor position is known to be one of ω and ω+π, for example as indicated by a resolver, the proposed invention can be used to determine whether the actual position is ω or ω+π.

3 Claims, 4 Drawing Sheets

POSITION DETECTION DEVICE FOR PERMANENT MAGNETIC MACHINES

CROSS REFERENCE TO RELATED APPLICATIONS

This application claims priority to US Provisional Application 60/823,042 filed Aug. 21, 2006 and hereby incorporated by reference in its entirety, herein.

FIELD OF INVENTION

The invention relates to permanent magnetic machines and particularly to mechanisms to detect the position of a rotor in relation to a stator.

BACKGROUND

Permanent magnet electric machines in which one of a stator and rotor has permanent magnets (PMs) and the other has magnetic coils, employ waveform generators that rely on an input indicating the precise instantaneous position in order to work correctly. Incremental encoders, such as those that can indicate a relative displacement per interval of time such that a cumulative count can give a total displacement, can be used to track position over time. Incremental encoders are simple and relatively inexpensive, but do not provide an absolute position, which is information that is required to control many types of permanent magnet machines, particularly at startup. When a brushless DC motor starts, the initial position must be known. Currently, in the automotive industry, it is believed that resolvers are preferably used for the purpose of indicating rotor position. The resolver can indicate the absolute position of the rotor relative to the stator including an initial position. Other types of absolute position indicators are also known, such as absolute encoders which employ a variety of different electrical, optical, or mechanical principles.

The designs of certain types of resolvers are suitable for use in PM motors that have even numbers of pole pairs. The position indicated by a resolver indicates at least a unique driving state of the PM motor, even if it can be mapped to more than one rotor position as it can for an even pole-pair motor. This is because the even pole-pair motor have at least two rotor positions that are identical in terms of the optimal excitation signal required to drive them. However, when such a resolver is used for a motor with an odd number of pole pairs, each position indicated by the resolver maps to two distinct positions of the rotor that do not correspond to identical driving states. However, it may be desirable, for cost reasons for example, to use such a position indicator for the control of a permanent magnet machine with an odd number of pole pairs. For example, if the demand for such indicators is higher than for resolvers suitable for odd pole-pair motors, then the costs would tend to be lower. It would be desirable under such circumstances, to use the low-cost indicators in odd pole-pair motor to take advantage of the lower costs.

SUMMARY

The invention indicates a correct one of multiple rotor positions, which are offset by a predetermined angle. For example, the invention can determine, in a PM machine, which of two possible positions a rotor is in when the position is known only within $\pm\pi$ radians. If the actual rotor position is known to be one of $\omega$ and $\omega+\pi$, for example as indicated by a resolver, the proposed invention can be used to determine whether the actual position is $\omega$ or $\omega+\pi$.

To achieve this, a voltage is applied to the windings of a PM machine to create a magnetic field that is either positively aligned with the PM direct axis (D-axis) or negatively aligned with the D-axis. A voltage pulse is computed to generate field which is either positively or negatively aligned with the D-axis of the PM fields of the rotor. Whether it is positively aligned or negative aligned is unknown, since the input to the procedure is the rotor position $\pm\pi$ radians. Then a voltage pulse is generated which is the inverse of the former so that it has the reverse alignment. If the first pulse is positively aligned, the coils are operating at a higher level of saturation. If the operating point is chosen in the non-linear portion of the flux-density (B) vs. applied magnetic intensity (H) curve (or B-H curve), the inductance will be different for the forward and reverse alignments of the PM field and the field generated by the windings, resulting in a difference in the current vector magnitude, which is measured. If the winding field is positively aligned with D-axes, it increases the saturation level in the core so that the motor current vector will be relatively greater in magnitude compared to when the coils are negatively aligned with the PM d-axes. The core saturation level, diminished by the negative alignment, reduces the motor current vector due to the higher inductance and the saturation level, increased by the positive alignment, increases the motor current vector due to the lower inductance. By comparing a measured current peak level during application of a positive and negative voltages in the windings, the uncertainty of $\pi$ in the rotor position can be eliminated.

Once the initial position is determined, using information from the even pole-pair resolver and the disambiguation information provided by the current vector measurement, the waveform generator can be controlled to apply an optimal startup waveform. Thereafter an incremental encoder can be used to keep track the absolute position.

The invention is applicable to motors and generators and can be used for linear and multi-axis motors as well. The invention can be applied to low-cogging motors as well as stepper motors. The absolute position indication can be provided by any type of indicator including absolute optical and mechanical encoders or other devices.

According to an embodiment, a method of determining a position of a permanent magnet machine includes generating a signal from a winding of a permanent magnet machine. The method further may include combining the signal with information indicating more than one possible position of the permanent magnet machine to determine a more exact position of the permanent magnet machine. The generating may include exciting the winding by generating at least one pulse. The generating may include exciting the winding by generating a first wave form with a component that is opposite in polarity to that of a second waveform, such that the different levels of saturation are produced in at least one winding core for each, the signal being responsive to different levels of saturation in the winding as a result of the influence of permanent magnets in the permanent magnet machine.

Preferably, the generating includes using a waveform generator to generate an excitation signal and the method further comprises using the same waveform generator to apply a signal to the winding to activate the permanent magnet machine. Preferably, the generating includes generating a current that causes a saturation level of a core of the permanent magnet machine to traverse a non-linear portion of its flux-density vs. applied magnetic intensity (B-H) curve.

According to an embodiment, a method of determining a position of a permanent magnet machine includes measuring the respective currents in a winding of a permanent magnet machine driven by first and second signals and determining a position of a rotor relative to the winding responsively to the respective currents. The winding can be, for example, a driving winding of a motor or generator. The determining may include determining at least two possible positions of a rotor using a position detector and determining the correct one of the at least two possible positions from the respective currents. In a more particular embodiment, the position sensor is a resolver. Preferably, the first and second signals produce different current vectors in the winding and also, preferably, the first and second signals produce different saturation levels in a core of the winding. The method may further include generating the first and second signals with a signal generator and driving the permanent magnet machine by using the same signal generator to generate signals responsive to a result of the determining.

According to an embodiment, a method of determining a position of a permanent magnet machine includes detecting at least one property change resulting from varying the saturation level in a core of a permanent magnet machine driven by at least one driving signal and determining a position of a rotor relative to the winding responsively to the at least one property. The winding may include a driving winding of a motor. The determining may include determining at least two possible positions of a rotor using a position detector and determining the correct one of the at least two possible positions from the at least one property. The position sensor may be, for example, a resolver. The driving signal, preferably, produces different current vectors in the winding. For example, the driving signal may include first and second components that produce different currents in the core. More specifically, the driving signal may include first and second oppositely directed pulses. The method may also include generating the driving signal with a signal generator and rotating a rotor of the permanent magnet machine using the same signal generator by generating signals responsive to a result of the determining.

According to an embodiment, a permanent magnet machine has a first part having windings and a second part, which is movable relative to the first part, having permanent magnets. The permanent magnet machine has positions of the permanent magnets relative to the windings corresponding to a first number of identical driving states. For example, an even pole-pair motor has at least two identical driving states in that it there are at least two rotor positions for which the optimal driving signal is the same. A position detector is configured to indicate a second number of positions of the permanent magnets relative to the windings, the second number being greater than the first number. A controller is configured to receive a signal responsive to a current in the windings and a signal from the position detector. The first number may be, for example, odd while the second number is even. The first number may be, for example, zero while the second number is even. In a preferred embodiment, the permanent magnet machine is a motor and the position indicator is a resolver configured to indicate the rotor positions of even pole-pair motors.

BRIEF DESCRIPTION OF THE DRAWINGS

The accompanying drawings, which are incorporated herein and constitute part of this specification, illustrate presently preferred exemplary embodiments of the invention, and, together with the general description given above and the detailed description given below, serve to explain features of the invention.

DETAILED DESCRIPTION OF EMBODIMENTS

Figure 1A:
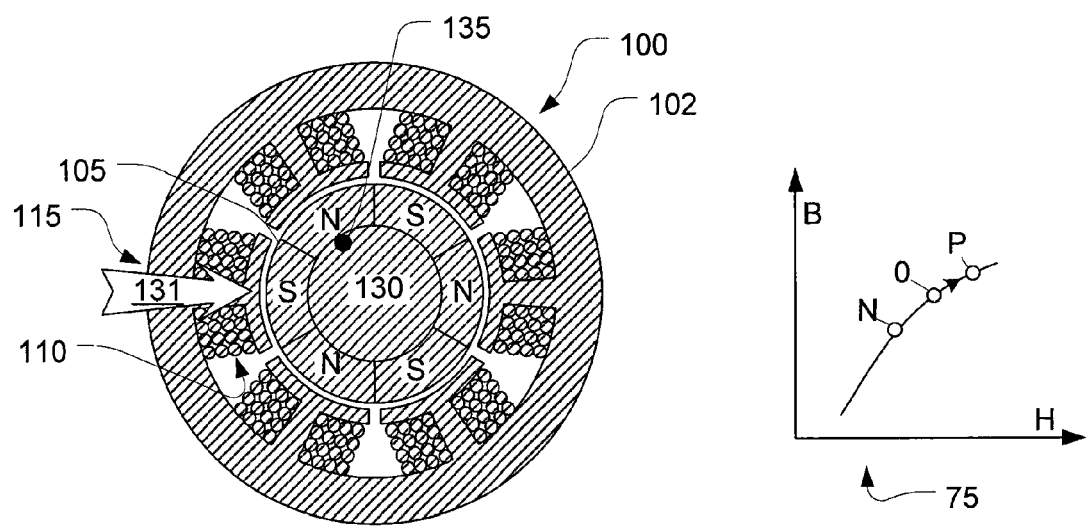
FIG. 1A shows a stepper motor in a first position with a positive alignment of the armature fields and permanent magnet fields.
Figure 1B:
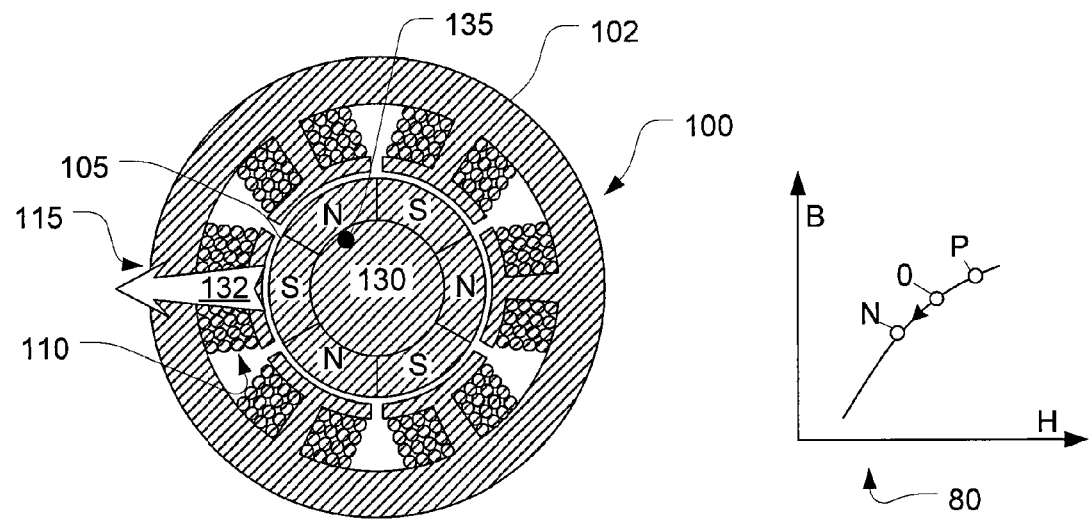
FIG. 1B shows a stepper motor in a first position with a negative alignment of the armature fields and permanent magnet fields.

Referring to FIGS. 1A and 1B a stepper motor 100 with a permanent magnet (PM) rotor 130 oriented in an arbitrary position relative to a stator 102 with an armature. For the sake of initial discussion, the rotor is oriented such that each magnet 105 of the rotor is aligned with the winding 115 of the stator 102. The position of the rotor 135 is indicated by a circle 135 and the position is the same in both FIGS. 1A and 1B.

To understand the principle of the invention, assume that the winding 115 is energized to generate a field directed as indicated by the arrow 131. In the case of FIG. 1A, the field is aligned with the field of the permanent magnet 105 adjacent the winding 115. In that case, assume the motor is constructed such that the winding core is operating in the non-linear portion of the flux-density (B) vs. applied magnetic intensity (H) curve (or B-H curve) shown at 75. The initial B and H coordinate is indicated by 0. When a pulse is applied to cause the winding 115 to generate a field as indicated by the arrow 131, the B and H coordinate is moved to position P, which corresponds to the positive alignment between the PM field and the winding field.

In the case of FIG. 1B, again the motor is assumed to be constructed such that the winding core operates in the non-linear portion of the B-H curve as shown at 80. Again, the initial B and H coordinate is indicated by 0. When a pulse is applied to cause the winding 115 to generate a field as indicated by the arrow 132, the B and H coordinate is moved to position N, which corresponds to the negative alignment between the PM field and the winding field.

Comparing graphs 75 and 80, in the case of a positive alignment of the permanent magnet field and the coil field, the core of the winding 115 is more saturated during the pulse than in the case of a negative alignment of the permanent magnet field and the coil field. The higher saturation level will cause a higher current because of the relatively lower inductance of the more saturated coil under the conditions of graph 75. The lower saturation level will cause a lower current because of the relatively higher inductance of the less saturated coil under the conditions of graph 80.

Figure 1C:
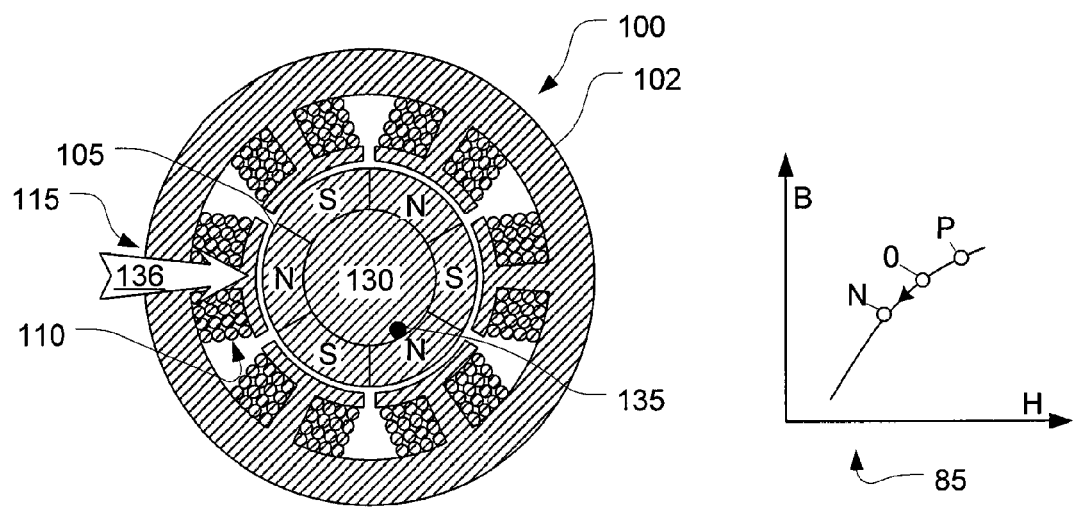
FIG. 1C shows a stepper motor in a second position that is π radians removed from the first position with a negative alignment of the armature fields and permanent magnet fields.
Figure 1D:
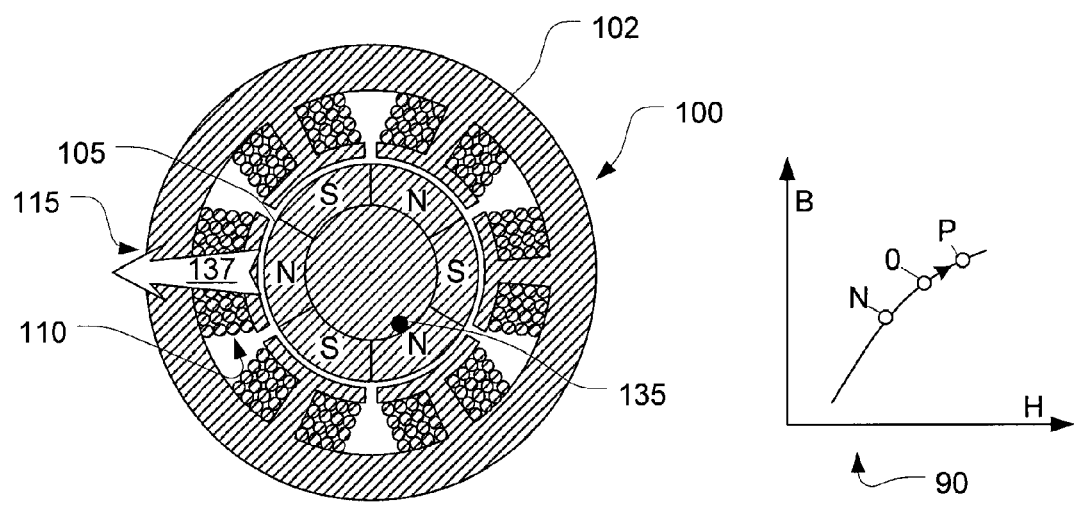
FIG. 1D shows a stepper motor in a second position that is π radians removed from the first position with a positive alignment of the armature fields and permanent magnet fields.

Given the different currents expected under the conditions of positive and negative alignment of the armature field and the permanent magnet field, if the actual currents are measured, the position of the rotor 130 can be determined. Referring to FIGS. 1C and 1D, the rotor 130 is shown in a different position, which is π radians removed from the position of the rotor 130 in FIGS. 1A and 1B. In the two cases of FIGS. 1C and 1D, the winding 115 is energized in directions indicated by arrows 136 and 137, just as in the cases of FIGS. 1A and 1B, but in the cases of FIGS. 1C and 1D, the PM 105 field is negatively aligned for the pulse indicated by arrow 136 (same direction as arrow 131 in FIG. 1A) and positively aligned for the pulse indicated by arrow 137 (same direction as arrow 132 in FIG. 1B).

Referring to graphs 85 and 90, the results of the current measurements will be opposite, when the rotor 130 is in the position of FIGS. 1C and 1D, from the results when the rotor is in the position of FIGS. 1A and 1B. That is, the difference between the two measured currents corresponding to the energizations indicated by the arrows 131 and 132 will be the opposite of the difference between the two measured currents corresponding to the energizations indicated by the arrows 136 and 137. Using that fact, the position indicated by the absolute position indicator, which cannot distinguish the position of FIGS. 1A and 1B from the position of FIGS. 1C and 1D, can be used together with the distinction provided by the current measurements to generate an unambiguous determination of rotor position.

Figure 2A:
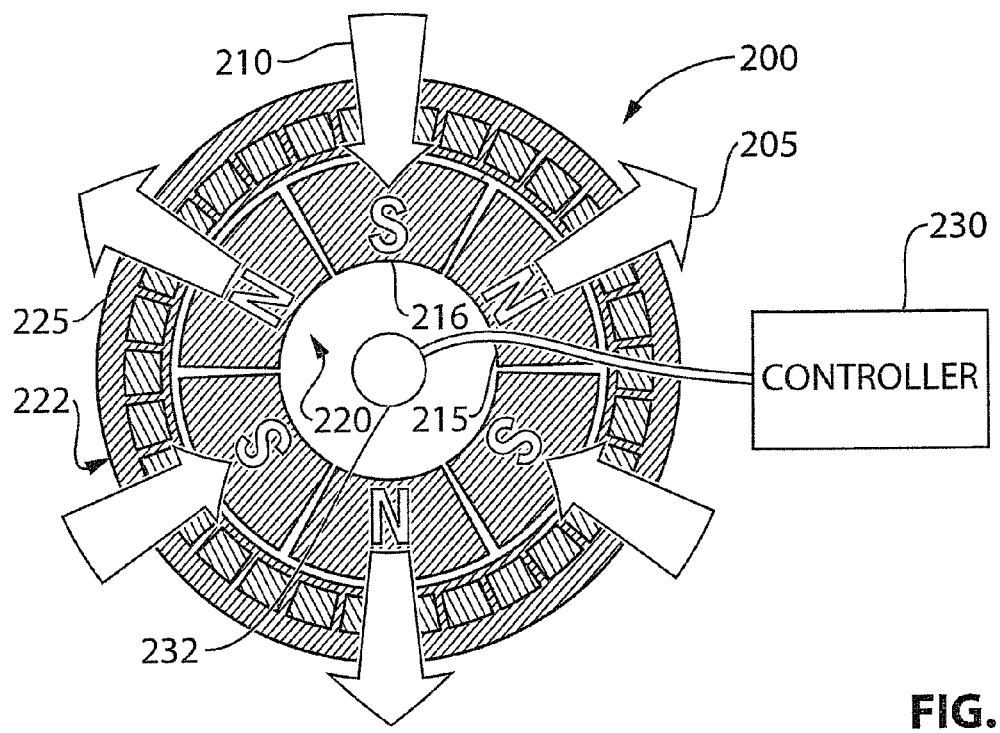
FIGS. 2A and 2B illustrate a 3-phase permanent magnet motor with a positive and negative alignments between the armature fields and the permanent magnet fields.
Figure 2B:
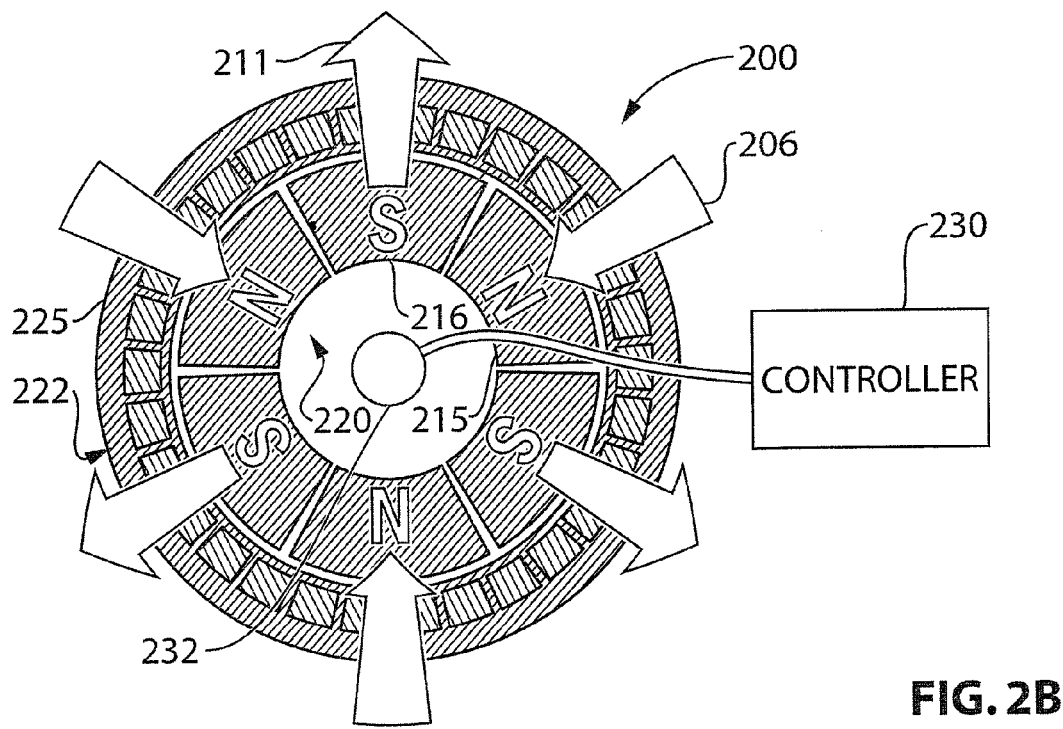

FIGS. 2A and 2B illustrate a preferred embodiment of a practical motor 200 to which the invention may be applied. The motor 200 has a stator 222 with an array of stator windings 225. As will be apparent to those of ordinary skill in the relevant art, a controller 230 can energize the stator 222, using, for example, three phases, to produce a field figuratively illustrated by the arrows 205, 210. As the motor is rotated, the field pattern indicated by the arrows may, more or less, be considered to rotate smoothly around the stator forcing the rotor 220 to rotate. To determine the position of the rotor 220, the controller 230 determines an initial position from a position sensor 232 and runs a program to generate a first field pattern such as indicated in FIG. 2A and later to generate a second pattern such as indicated in FIG. 2B with the opposite current directions. The patterns are each only applied for an instant, preferably using a pulse pattern used for powering the motor under ordinary operation. The opposite current directions cause the armature field pattern to flip as indicated by the arrows 206 and 211, which are directed opposite to their counterparts 205 and 210 in FIG. 2B.

In the case of FIG. 2A, a voltage in a first direction is applied to all the armature windings to produce a field that is, preferably, aligned (more or less, depending on the motor design and programming preferences) with the direct axes. Whether the alignment is positive or negative is not determined when performing the operation, but the position indicator provides enough information to generate a field that has a strong direct component for most or all of the permanent magnets (again depending on the motor and controller design). Then the voltage is switched giving the case of FIG. 2B. Current measurements are made for both the positive voltage and the negative voltage and the current vector amplitudes are compared. If the controller's internally stored position indication corresponds to the positive alignment of the magnet and winding fields, and the result of the current measurement indicates such a positive alignment, then the internal model of position is not adjusted. If the measurements indicated an anti-alignment between the magnet and winding fields, the controller information is updated to correct it. If the controller's stored position starts out corresponding to anti-alignment, the information would not be updated if the current measurement indicated anti-alignment.

Although in the discussion above, a particular winding was discussed about a single core, in a practical application, the windings of many cores would ordinarily be energized simultaneously. In such motors, the permanent magnets need not be aligned with particular cores for the armature field to be aligned with the fields of all the permanent magnets, as would be clear to those of skill in the art. Also, in a practical motor, there may be three separate winding phases producing any of a variety of moving field patterns to rotate the rotor.

Although in the discussion above, the rotor is internal, the invention is just as applicable to motors with a stator within a rotor or to motors with stators that are axially offset from rotors or any type in-between. Also, although the illustrations are of motors with three pole-pairs, the invention is just as applicable to motors with any odd number of pole-pairs.

Figure 3:
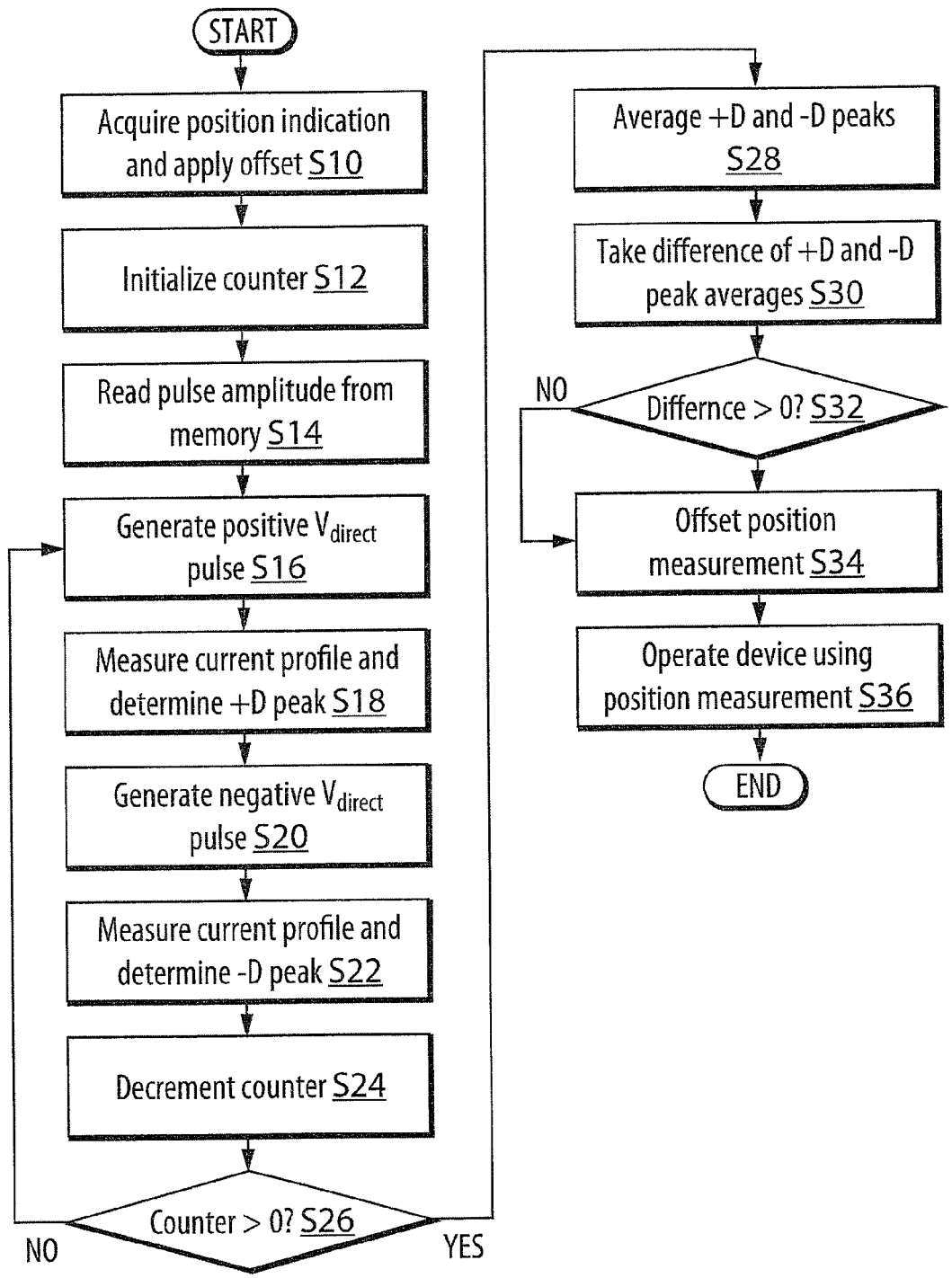
FIG. 3 illustrates a flow chart representing a procedure for operating a permanent magnet including a procedure that determines the absolute position of the rotor.

Referring to FIG. 3, a procedure that may be followed by a controller to determine the rotor position begins at S10 by determining an absolute position indication from a suitable indicator. In a preferred embodiment, the controller is a digital programmable device and the position indication is a numerical indication of position acquired and stored in a memory. In an example, the position indication is provided by a resolver.

In addition, in the same step S10, an adjustment which is preferably applied to the measured position to account for a difference between the indicator's reference point and a reference point used to indicate the actual rotor position. For example, the indicator may not be installed with a zero angle that is precisely aligned with the rotor zero angle. This value used for adjustment is preferably stored in a digital programmable memory store so that it can be readily retrieved during a start-up operation.

The measured rotor position, adjusted with the offset value, is preferably stored in a memory. The measured rotor position is ambiguous by a predetermined value, for example, if a resolver designed for even pole-pair PM machine is used, its indication of position would not distinguish between $\omega$ and $\omega+\pi$ rotor position for odd pole-pair PM machines, where $\omega$ is the indicated rotor position, so the predetermined value would be $\pi$.

In step S12, a counter for an iterative measurement procedure is initialized. In step S14, a pulse voltage value is determined, preferably by being read from a memory. The pulse voltage value indicates an experimentally-determined value that ensures that the coils operate in a non-linear portion of the flux-density (B) vs. applied magnetic intensity (H) curve (or B-H curve). In step S16, a corresponding positive voltage pulse is applied to the coils and the current in the coils is measured. Preferably, the currents are measured over an interval of time to capture a current measurement. This may be done, for example, by sampling the currents and storing current profiles. Then in step S18 a peak of current vector magnitude can be determined by, for example, interpolating the sampled current signals or by selecting a single representative sample. Alternatively, if an optimal timing can be established by experiment, a single sample for one or several coils, which is/are representative of a peak, can be acquired at the correct timing. Various other devices for measuring a signal peak can be used. Alternatively, the method can use a non-peak signal which may be suitable for making the required differentiation. In step S20, a negative voltage pulse is applied to the coils and the current in the coil is again measured at S22, as discussed with reference to step S18.

As a result of the above, two peak values of the current vector are acquired, one corresponding to the negative pulse and one corresponding to the positive pulse. The procedure of steps S16 to S22 is repeated to acquire multiple samples which are later averaged, so in step S24, the counter is decremented and control returns to step S16. In step S26, if the counter is greater than zero, steps S16 to S22 are repeated and if not step S28 is executed. During each iteration of steps S16 to S22, the acquired negative pulse peaks and positive pulse peaks are stored. After the counter reaches zero at step S26, these values are averaged in step S28 to produce an average of the peak current vector when the negative voltage is applied and an average of the peak current vector when the positive voltage is applied. At step S30 the difference between the two average values is taken and at step S32 it is determined if the difference negative or positive. If the difference is positive, the predetermined value is added to the rotor position in step S34. If the difference is negative, the rotor position remains unchanged. In step S36, the PM machine is operated using the startup position that was determined beginning in step S36. Thereafter, the position can be continuously updated using the initial position by acquiring and using the signal from an incremental encoder.

While the present invention has been disclosed with reference to certain preferred embodiments, numerous modifications, alterations, and changes to the described embodiments are possible without departing from the sphere and scope of the present invention, which is described, by way of example, above. Accordingly, it is intended that the present invention not be limited to the described embodiments, but that it have the full scope and equivalents thereof.

The invention claimed is:

1. A permanent magnet machine, comprising:

a motor with a stator having cores with windings thereon and a rotor, which is movable relative to the stator, having permanent magnets, the motor having an odd number of pole pairs;

a resolver configured to indicate an even number of pole pair positions, whereby upon start-up the resolver identifies a rotor position ambiguous by a predetermined value; and a controller configured to receive a position signal from the resolver and generating a driving signal for moving the motor and wherein, upon start-up, the controller is configured to (i) pulse a first voltage pattern to the windings in the form of the drive signal corresponding to a presumed rotor position and obtain a first measurement of current in the windings resulting from the application of the first voltage pattern, (ii) pulse a second voltage pattern, opposite of the first voltage pattern, and obtain a second measurement of current in the windings resulting from the application of the second voltage pattern, and (iii) compare the first and second current measurements to resolve said rotor position ambiguity.

2. A machine according to claim 1, wherein the voltage pattern is applied at an amplitude sufficient to generate current that causes a saturation level in various stator cores to traverse a non-linear portion of their flux-density vs. applied magnetic intensity (B-H) curves as a result of the influence of the permanent magnets in the machine.

3. A machine according to claim 2, wherein the first voltage pattern is applied repeatedly to obtain a series of current readings that are aggregated to yield the first current measurement and the second voltage pattern is applied repeatedly to obtain a series of current readings that are aggregated to yield the second current measurement.

* * * * *